United States Patent [19]  
Filipovich

[11] 4,134,129  
[45] Jan. 9, 1979

[54] TRI-DIRECTIONAL POSITIONING DEVICE FOR OPTICAL SYSTEM INCLUDING LOCKING MEANS

[75] Inventor: Danny Filipovich, Chicago, Ill.

[73] Assignee: Bell & Howell Company, Chicago, Ill.

[21] Appl. No.: 749,846

[22] Filed: Dec. 13, 1976

[51] Int. Cl.² ............... H04N 9/04; G03B 33/10; G03B 17/42

[52] U.S. Cl. .................... 358/55; 354/103; 354/204

[58] Field of Search ............ 358/229, 55; 354/189, 354/103, 204; 350/173

[56] References Cited

U.S. PATENT DOCUMENTS

| 2,301,921 | 11/1942 | Willcox | 354/189 X |
|---|---|---|---|
| 2,725,783 | 12/1955 | Jackson | 358/229 X |
| 3,143,944 | 8/1964 | Takata | 354/189 X |
| 3,825,938 | 7/1974 | Koch | 354/189 X |
| 4,008,372 | 12/1977 | Ueno et al. | 358/229 X |

FOREIGN PATENT DOCUMENTS

| 1046474 | 12/1958 | Fed. Rep. of Germany | 354/189 |
|---|---|---|---|
| 6709070 | 1/1968 | Netherlands | 354/189 |
| 267705 | 4/1950 | Switzerland | 354/189 |

Primary Examiner—Robert L. Griffin  
Assistant Examiner—Aristotelis M. Psitos  
Attorney, Agent, or Firm—Harold V. Stotland; John E. Peele, Jr.; Roger M. Fitz-Gerald

[57] ABSTRACT

The positioning device includes a carrier for an element of an optical system, which is to be positioned very carefully with respect to a certain axis. The device includes first means to move the element in a direction parallel to the axis, second means for tilting the element with respect to the axis, and third means to move the element in planes perpendicular to the axis. The device also includes a locking mechanism to lock the carrier in the selected position determined by the conditions of the first, second and third means.

17 Claims, 13 Drawing Figures

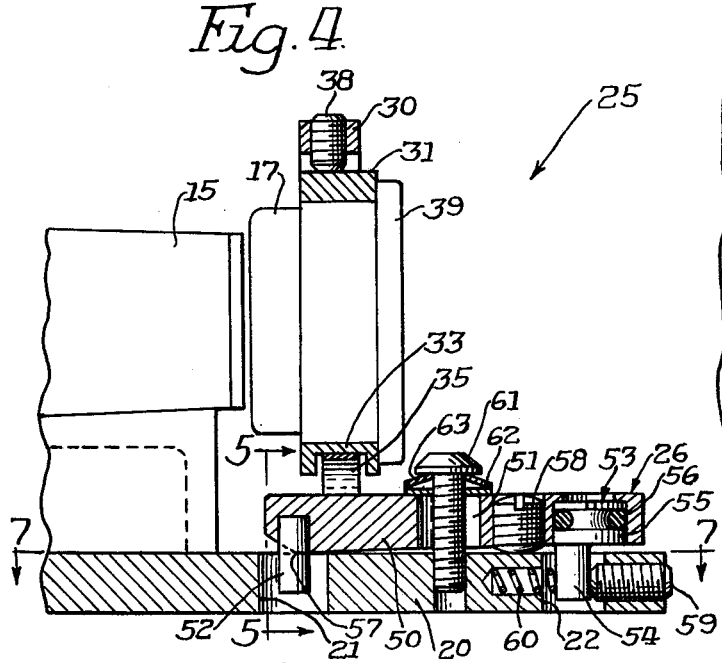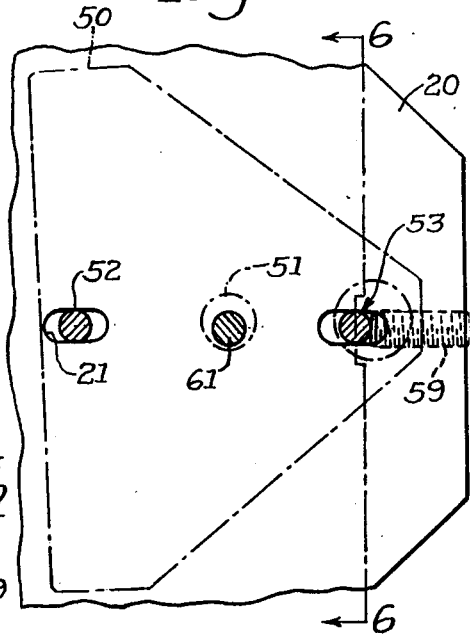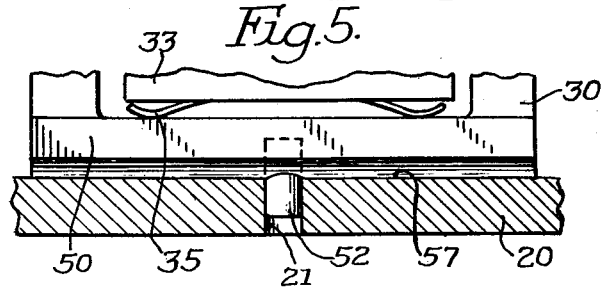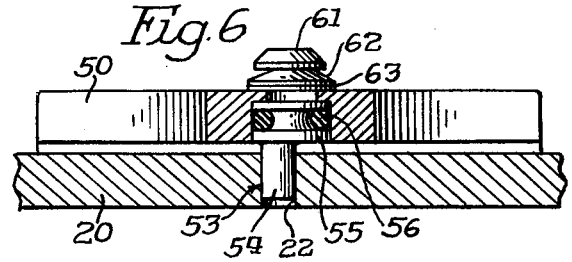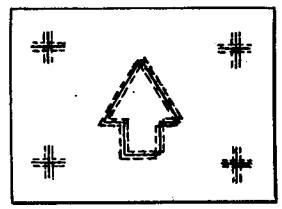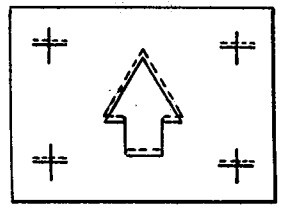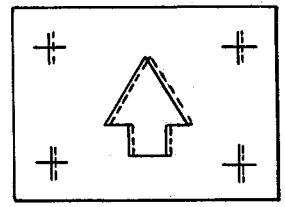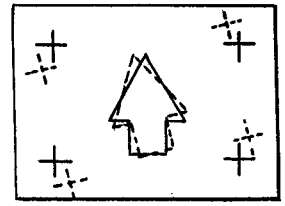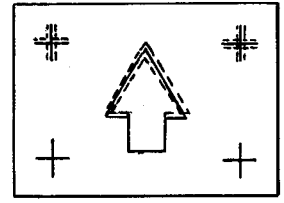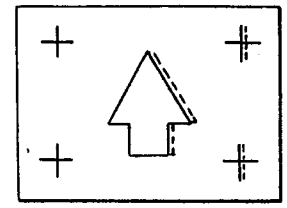

TRI-DIRECTIONAL POSITIONING DEVICE FOR OPTICAL SYSTEM INCLUDING LOCKING MEANS

BACKGROUND OF THE INVENTION

In a color video camera, light from the object is split into three color components, usually red, green and blue. Three detectors are positioned respectively to receive these three different components, and convert them into electrical signals for further processing. The detectors must be very accurately and carefully positioned in order to generate electrical signals which are accurate representations of the corresponding color image.

SUMMARY OF THE INVENTION

It is therefore an important object of the present invention to provide a device for positioning the detector for a video camera, for example, so as to generate electrical signals being an accurate representation of the color component to which it corresponds.

Another object is to provide such a device that can be moved toward and away from the optical system, rotated in planes perpendicular to the optical system and tilted with respect to an axis of the optical system.

In summary, there is provided a device for positioning an element of an optical system relative to an axis thereof, and comprising a carrier for the element, first means cooperating with the carrier for moving the element in a direction parallel to the axis, second means cooperating with the carrier for tilting the element with respect to the axis, third means cooperating with the carrier for moving the element in planes perpendicular to the axis, and means for locking the carrier in a selected position determined by the conditions of the first means, the second means and the third means.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

BRIEF DESCRIPTION OF THE DRAWINGS

For the purpose of facilitating an understanding of the invention, there is illustrated in the accompanying drawings, a preferred embodiment thereof, from an inspection of which, when considered in connection with the following description, the invention, its construction, and operation, and many of its advantages should be readily understood and appreciated.

FIG. 4 is a view in vertical section taken along the line 4—4 of FIG. 3;

FIG. 5 is a view in vertical section taken along the line 5—5 of FIG. 4;

FIG. 6 is a view in vertical section taken along the line 6—6 of FIG. 7;

FIG. 7 is a view in vertical section taken along the line 7—7 of FIG. 4, with the platform of the detector carrier being shown in phantom; and FIGS. 8 to 13 are schematic representations of images when the position of the detector is correct and incorrect.

DESCRIPTION OF THE PREFERRED EMBODIMENT

Figure 1:
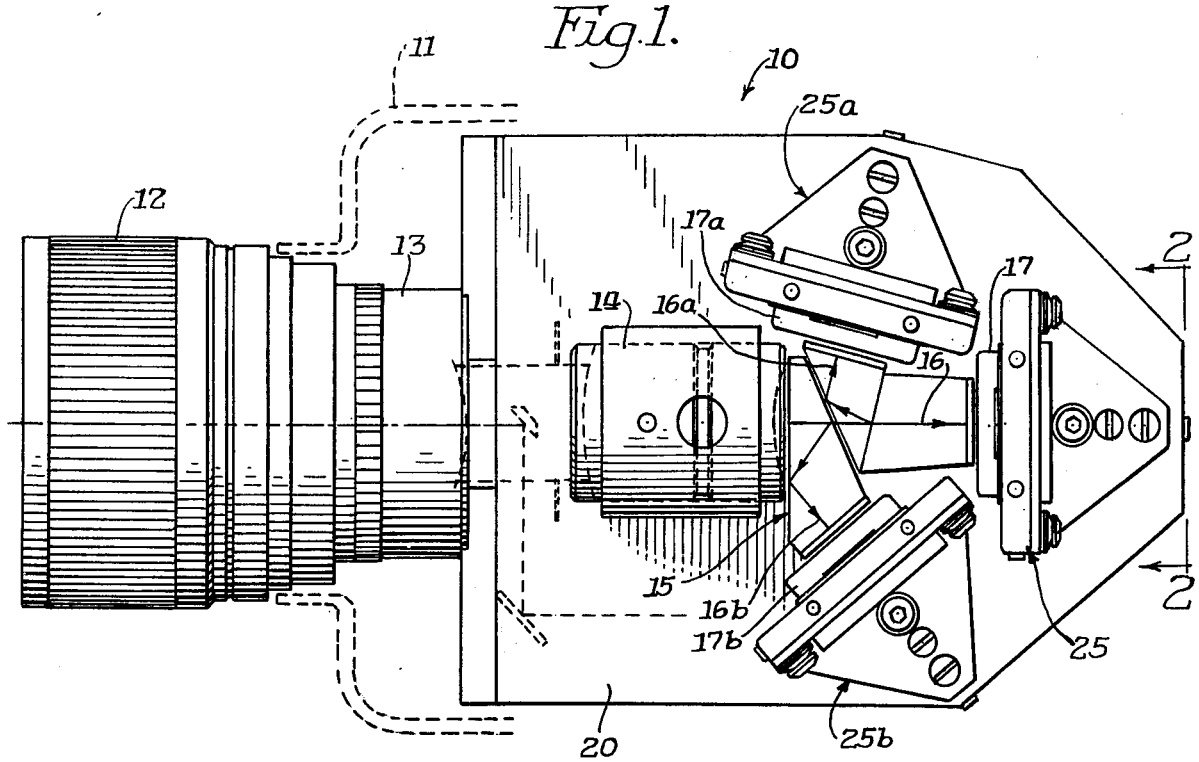
FIG. 1 is a top plan view of a color video camera with the housing substantially removed, having three positioning devices each incorporating the features of the present invention.
Figure 2:
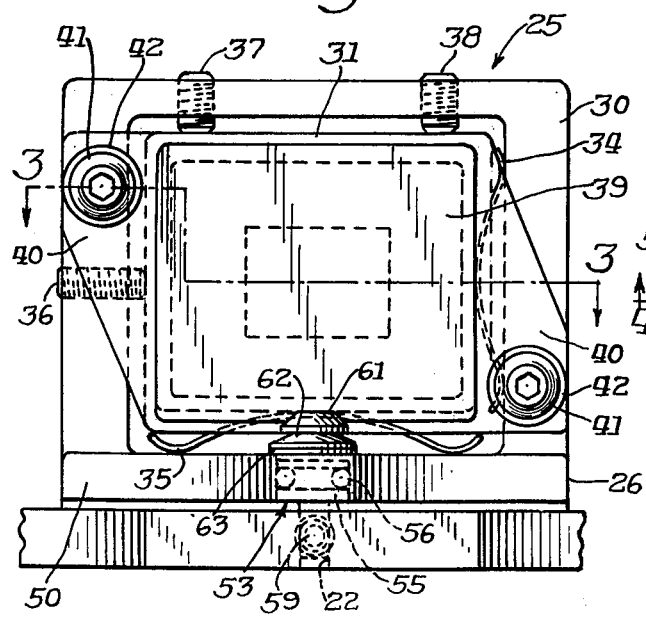
FIG. 2 is an end elevational view, on an enlarged scale, of one of the positioning devices of FIG. 1, taken along the line 2—2 thereof.
Figure 3:
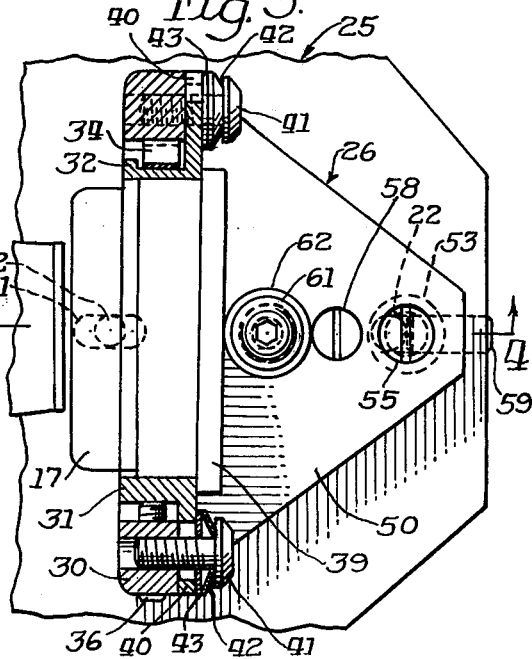
FIG. 3 is a view in horizontal section taken along the line 3—3 of FIG. 2.

Turning now to the drawings, and more particularly to FIG. 1 thereof, there is shown a color video camera 10 mounted in a housing 11, only a portion of which is shown (in phantom). The camera 10 includes a focusing lens assembly 12, a zoom lens assembly 13, and a prime lens assembly 14. Light from the object passes through these lens assemblies 12, 13 and 14 and is directed to a prism system 15 which may be of the type shown in U.S. Pat. No. 3,202,039 to Lang et al., dated Aug. 24, 1965. As explained in such patent, the prism system 15 separates light passing through the lens assemblies 12, 13 and 14 into three basic color components, usually green, red and blue, which respectively travel along paths parallel to optical axes 16, 16a and 16b. The three color components respectively strike detectors 17, 17a and 17b which convert the color components into electrical signals. These three detectors may be what is commonly called CIDs or charged injected detectors. When these electrical signals are reconverted into color images by a television, the three individual color images must be superimposed precisely to obtain a natural color image. Because of inaccuracies in the prism system 15, the mounting of the CIDs, etc., there must be the capability of adjusting the positions of the three detectors 17, 17a and 17b. There are three positioning devices 25, 25a and 25b mounted on a plate-like base 20, respectively for the three detectors 17, 17a and 17b. Each is identical and therefore the following explanation will be directed only to the positioning device 25, although it is to be understood that similar comments are applicable to the other two.

Details of the positioning device 25 may be understood by reference to FIGS. 2 to 7. Just beneath the positioning device 25 in the base 20 are two slots 21 and 22 both lying on an axis parallel to the optical axis 16. Each of the slots 21 and 22 is elongated in the direction of the optical axis 16. The positioning device 25 includes a carrier 26, which in turn has a frame 30 supported by a platform 50. The frame 30 is generally rectangular and has a rectangular opening therein, within which opening is located a holder 31. One of the shorter side walls of the holder 31 is formed into a retainer 32, and one of the longer walls is formed into a retainer 33. Leaf springs 34 and 35 are respectively located within the retainers 32 and 33 and respectively abut against the adjacent portions of the interior of the frame 30. A first set screw 36 threadably engages in a hole in the wall of the frame 30 opposite the leaf spring 34. The set screw 36 is positioned to contact the center of the adjacent wall of the holder 31. The frame 30 further includes a pair of set screws 37 and 38 which threadably engage in holes in the wall of the holder 31 opposite the leaf spring 35. The set screws 37 and 38 contact points on the adjacent wall of the holder 31 respectively on opposite sides of the midpoint thereof. It may be seen that the leaf spring 34 resiliently urges the holder 31 against the set screw 36, while the leaf spring 35 resiliently urges the holder 31 against the set screws 37 and 38.

A generally rectangular socket 39 is mounted in the holder 31 which socket has terminals to accommodate the pins from the detector 17. The holder 31 has two outwardly extending tabs, respectively with holes therein to accommodate screws 41. These screws threadably engage corresponding holes in the frame 30. A spring washer 42 and a slide washer 43 (e.g., made of TEFLON) are arranged between the head of each screw 41 and the associated tab 40.

To position the detector 17 in planes perpendicular to the optical axis 16, the screws 41 are loosened slightly, such as to maintain the deformation of the washers 42, thereby maintaining the holder 31 frictionally against the frame 30. In such condition, the holder 31 can be moved by rotating the set screws 36, 37 and/or 38. The washers 43 constitute lubricating or sliding elements so that the holder 31 can be so moved.

To align the detector 17, its electrical output is connected to a television monitor. Assuming the detector 17 is to convert the green components into electrical signals, the television monitor will display a green color image. If the image is not centered, that is to say is either too high or too low, and/or is to the right or to the left, or if the image is rotated, the set screws 36, 37 and 38 may be operated to position the detector 17 such that the image is properly centered and rotated. If the image is located too far to the right, the set screw 36 is rotated counterclockwise (e.g.) whereby the leaf spring 34 resiliently urges the detector 17 to the left. Similarly, if the image started out too far to the left, the set screw 36 should be rotated clockwise (e.g.) against the biasing of the leaf spring 34 to move the detector to the right. If the image is too high, the set screws 37 and 38 may be rotated clockwise (e.g.) to move the detector 17 against the action of the leaf spring 35, thereby lowering the detector 17. Similarly rotating the set screws 37 and 38 in the reverse direction causes the detector 17 to rise. If the image must be rotated properly to align it, then the set screw 37 is rotated in one direction while the set screw 38 is rotated in the opposite direction, causing rotation of the detector 17 in one direction. If the set screws 37 and 38 are respectively rotated in the opposite directions, the detector 17 will also be rotated in its opposite direction.

Thus, the set screws 36, 37 and 38 perform the task of positioning the detector 17 in three of the six directions, that is left-right, up-down, and rotation. Once the proper positions have been attained, the screws 41 are tightened to draw the holder 31 tightly against the frame 30 and fix the detector 17.

The proper positioning of the detector 17 in the other three directions will now be explained. The platform 50 securely holds a depending pin 52 which extends into the slot 21 in the base 20. There is provided a horizontal tilt control 53 which includes a pin 54 and an eccentrically position head 55. The head 55 has an O-ring 56 associated therewith, the combination being located within a hole in the base 20 that matches the shape of the head 55. The pin 54 depends into the slot 22 in the base 20. The axis of the pin 52 is substantially vertical and is substantially perpendicular to the optical axis 16. The head 55 has a slot to accommodate a screwdriver, and when such head is rotated, the eccentricity thereof causes the platform 50 to rotate in a plane perpendicular to the axis of the pin 52. Thus, if the image viewed by the operator on the monitor is such as to require changing the horizontal tilt to correct the same, he simply rotates the horizontal tilt control 53. It should be noted that the slots 21 and 22 and the hole 51 have room to accommodate movement of the pins 52 and 54 and the screw 61 respectively, to enable the platform 50 to move in the direction parallel to the optical axis 16.

The front, bottom portion of the platform 50 is cut away to define an edge 57 which contacts the upper surface of the platform 50 and constitutes a line for pivoting the platform 50. A vertical tilt control in the form of a set screw 58 threadably engages in a suitably formed hole in the platform 50. One end of the set screw 58 is formed with a slot for receiving a screwdriver tip, while the other radius-shaped end abuts against the upper surface of the base 20. Rotation of the set screw 58 in one direction causes the platform 50 to pivot about the edge 57, while rotation in the other direction will cause the platform 50 to tilt in the opposite direction.

Thus, if the operator viewing the monitor notes that an error in the image is occasioned by an inncorrect vertical tilt, he can rotate the set screw 58 in the appropriate direction until the error is corrected.

The sixth and final adjustment is furnished by a focusing set screw 59 which is threaded into an opening in the rear end of the platform 50, having its axis substantially parallel to the optical axis 16. One end of the set screw 59 has an hex opening therein to accommodate the tip of a tool and the other flat end abuts against the pin 54. A compression spring 60 is located within a suitable formed bore in the platform 50 so as to contact a diametrically opposite point on the pin 54. The spring 60 resiliently urges the pin 54, and thus the detector 17, outwardly, that is away from the prism system 15. Rotating the set screw 59 clockwise (e.g.) pushes the pin 54, and thus the detector 17, closer to the prism system 15. Rotating the set screw 59 counterclockwise (e.g) enables the spring 60 to push the pin 54, and thus the detector 17, outwardly.

The operator rotates the screw 59 in the appropriate direction to focus the image.

Associated with the platform 50 is a locking screw 61 which passes through an enlarged hole 51 in the platform 50 and threadably engages a hole in the base 20. A spring washer 62 and a slide washer 63 are located between the head of the screw 61 and the platform 50. After the operator has made the first three adjustments discussed previously by way of the screws 36, 37 and 38, he loosens the screw 61 slightly such that the spring washer 62 maintains its deformation. The slide washer 63 enables the platform 50 to be moved with respect to the base 20. The operator viewing the monitor makes appropriate adjustments in the horizontal tilt control 53, the set screw 58 and the set screw 59, in the manner previously described.

Actually the order of adjustment would probably be different than that given above. In practice the focusing adjustment would be performed first.

Reference may now be had to FIGS. 8 to 13 which represent images displayed on a monitor. In FIG. 8, the image is initially fuzzy because it is not in focus. By appropriately adjusting the set screw 59 in the proper direction, the image may be placed in focus and appear as the solid line in FIG. 8. In FIG. 9, the image shown in dashed line is too high. By rotating the set screws 37 and 38 in the proper direction, the detector 17 is lowered until the dashed line lines up with a solid line. In FIG. 10, the dashed line is too far to the right of the proper position shown in solid. The set screw 36 is turned in the correct direction to move the detector 17 to the left in the manner previously described, until the dashed line is lined up with the solid line. In FIG. 11, the image shown in dashed line is rotated with respect to the correct position shown in solid. By rotating the set screw 37 in one direction and rotating the other set screw 38 in the opposite direction the detector 17 can be rotated until the image is aligned with the solid line. In FIG. 12, the upper portion of the image is out of focus, while the lower portion is in focus, indicating that the detector 17 is improperly tilted vertically. To correct this, the set screw 58 is rotated in the appropriate direction, depending upon whether forward or reverse tilt is needed, to focus the entire image at the same time. In FIG. 13, the right side of the image is not in focus while the left is, indicating an incorrect horizontal tilt of the detector 17. This is corrected by rotating the horizontal tilt control 53 until the entirety of the image is properly focused.

Having made these adjustments, the screws 41 and 61 are tightened, thereby preventing any further, unwanted movement of the detector 17.

What has been described therefore is a positioning device 25 which can position an element of an optical system accurately in six different ways, which device has associated therewith locking means to hold the element in the selected position.

I claim:

1. An optical system having an optical axis and comprising a plate-like base, a carrier including a plate-like platform and an upstanding frame thereon, said platform lying upon said base, a light detector mounted in said frame, means on said base for directing light to said light detector, first means including a bearing member and a screw having an axis substantially parallel to said optical axis, said bearing member being operatively connected to said carrier, said screw threadably engaging said base and operatively engaging said bearing member, whereby rotation of said screw in one direction moves said carrier toward said light-directing means, and rotation in the opposite direction moves said carrier away from said light-directing means, said first means further including a compression spring having an axis substantially aligned with the axis of said screw and being located between said base and said bearing member and resiliently urging said carrier away from said light-directing means, second means cooperating with said platform and said base for tilting said platform with respect to said base, thereby to tilt said detector with respect to said axis, third means cooperating with said carrier for moving said detector in planes perpendicular to the axis, and means for locking said carrier to preclude operation of said first means, said second means and said third means.

2. An optical system having an optical axis and comprising a plate-like base, a carrier including a plate-like platform and an upstanding frame thereon, said platform lying upon said base, a light detector mounted in said frame, means on said base for directing light to said light detector, first means cooperating with said platform and said base for moving said platform with respect to said base in a direction parallel to the axis, thereby to move said detector in a direction parallel to the axis, second means including a first pin and a second pin and a head eccentrically mounted on said second pin, said first and second pins extending into said base and said carrier at spaced apart points thereon and having their longitudinal axes disposed generally parallel, said carrier having an opening for said head, whereby clockwise rotation of said head tilts said light detector about the axis of said first pin in one direction, and counterclockwise rotation tilts said light detector about the axis of said first pin in the opposite direction, third means cooperating with said carrier for moving said detector in planes perpendicular to the axis, and means for locking said carrier to preclude operation in a selected position determined by the condition of said first means, said second means and said third means.

3. The optical system set forth in claim 2, wherein said first means includes a screw threadably engaging said base and operatively engaging said second pin, and having an axis substantially parallel to said optical axis, whereby rotation of said screw in one direction moves said carrier toward said light directing means, and rotation in the opposite direction moves said carrier away from said light directing means.

4. An optical system comprising a plate-like base, a carrier including a plate-like platform and an upstanding frame thereon, said platform lying upon said base, a light detector mounted in said frame, means on said base for directing light to said light detector, first means cooperating with said platform and said base for moving said platform in a direction parallel to the axis, thereby to move said detector in a direction parallel to said axis, second means cooperating with said platform and said base for tilting said platform with respect to the axis, thereby to tilt said detector with respect to said axis, third means cooperating with said frame and said detector for moving said detector in planes perpendicular to the axis, said third means including first and second set screws respectively passing through threaded openings in said frame and operatively engaging said detector, the longitudinal axes of said set screws being substantially perpendicular to each other, first locking means for locking said platform to preclude operation of said first means and said second means, and second locking means for locking said detector to preclude operation of said third means.

5. An optical system comprising a plate-like base, a carrier including a plate-like platform and an upstanding frame thereon, said platform lying upon said base, a light detector mounted in said frame, means on said base for directing light to said light detector, first means cooperating with said platform and said base for moving said platform in a direction parallel to the axis, thereby to move said detector in a direction parallel to said axis, second means cooperating with said platform and said base for tilting said platform with respect to the axis, thereby to tilt said detector with respect to said axis, third means cooperating with said frame and said detector for moving said detector in planes perpendicular to the axis, said third means including first and second and third set screws respectively passing through threaded openings in said frame and operatively engaging said detector, said first and second set screws having substantially parallel longitudinal axes and operable in tandem to move said detector in a direction along a line substantially parallel to the axes of said first and second set screws in planes substantially perpendicular to the optical axis, said first and second set screws being operable individually to rotate said detector in said plane, said third set screw having its axis substantially perpendicular to the axis of said first and second set screws, first locking means for locking said platform to preclude operation of said first means and said second means, and second locking means for locking said detector to preclude operation of said third means.

6. The optical system set forth in claim 5, wherein said third means further includes first spring means resiliently urging said detector against said first and second set screws, and second spring means resiliently urging said detector against said third set screw.

7. An optical system comprising a plate-like base, a carrier including a plate-like platform and an upstanding frame thereon, said platform lying upon said base, a light detector mounted in said frame, means on said base for directing light to said light detector, first means cooperating with said platform and said base for moving said platform in a direction parallel to the axis, thereby to move said detector in a direction parallel to said axis, second means cooperating with said platform and said base for tilting said platform with respect to the axis, thereby to tilt said detector with respect to said axis, third means cooperating with said frame and said detector for moving said detector in planes perpendicular to the axis, first locking means for locking said platform to preclude operation of said first means and said second means, said first locking means including at least one screw and a spring washer for resiliently urging said platform against said base, and second locking means for locking said detector to preclude operation of said third means, said second locking means including at least one screw and a spring washer for resiliently urging said detector against said frame.

8. An optical system comprising a plate-like base, a carrier including a plate-like platform and an upstanding frame thereon, said platform lying upon said base, a light detector mounted in said frame, means on said base for directing light to said light detector, first means cooperating with said platform and said base for moving said platform in a direction parallel to the axis, thereby to move said detector in a direction parallel to said axis, second means cooperating with said platform and said base for tilting said platform with respect to the axis, thereby to tilt said detector with respect to said axis, third means cooperating with said frame and said detector for moving said detector in planes perpendicular to the axis, first locking means for locking said platform to preclude operation of said first means and said second means, said first locking means having a first condition in which the movability of said platform with respect to said base is substantially reduced but said first means and said second means are operable, said first locking means having a second condition in which movement of said platform with respect to said base is substantially precluded, said first locking means including means to facilitate sliding movement of said platform with respect to said base when said first locking means is in the first condition thereof, and second locking means for locking said detector to preclude operation of said third means, said second locking means having a first condition in which the movability of said detector with respect to said frame is substantially reduced but said third means is operable, said second locking means having a second condition in which movement of said detector with respect to said frame is substantially precluded, said second locking means includes means for facilitating sliding movement of said detector with respect to said frame when said second locking means is in the first condition thereof.

9. An optical system having an optical axis and comprising a plate-like base having a substantially planar first surface, a carrier including a plate-like platform and an upstanding frame thereon, said platform having a substantially planar second surface, said first and second surfaces being in juxtaposition over substantially their entire extents, a light detector mounted in said frame, means on said base for directing light to said light detector, first means cooperating with said platform and said base for moving said platform with respect to said base in a direction parallel to the axis, thereby to move said detector in a direction parallel to the axis, second means cooperating with said platform and said base for tilting said platform with respect to said base with respect to the axis, thereby to tilt said detector with respect to said axis, third means cooperating with said carrier for moving said detector in planes perpendicular to the axis, and means for locking said carrier to preclude operation of said first means, said second means and said third means.

10. The optical system set forth in claim 9, wherein said first means includes a bearing member and a screw having an axis substantially parallel to said optical axis, said bearing member operatively connected to said carrier, said screw threadably engaging said base and operatively engaging said bearing member, whereby rotation of said screw in one direction moves said carrier toward said light-directing means, and rotation in the opposite direction moves said carrier away from said light-directing means.

11. The optical system set forth in claim 9, wherein said light detector has two end portions and two side portions, said second means having a first portion for tilting said detector so as selectively to move said end portions toward and away from said light directing means, said second means having a second portion for tilting said detector so as selectively to move said side portions toward and away from said light directing means.

12. The optical system set forth in claim 9, wherein said carrier has a pivot edge, said second means including a screw threadably engaging said carrier and operatively engaging said base and spaced from said pivot edge, rotation of said screw being operative to tilt said carrier about said pivot edge.

13. The optical system set forth in claim 9, wherein said locking means includes a screw passing through said carrier and threadably engaging in said base.

14. The optical system set forth in claim 9, wherein said locking means further includes a spring washer resiliently urging said carrier against said base.

15. The optical system set forth in claim 9, wherein said locking means includes a screw passing through said carrier and threadably engaging in said base, a spring washer resiliently urging said carrier against said base, and a slide washer between said locking washer and said carrier to facilitate sliding movement of said carrier.

16. An optical system comprising a plate-like base having a substantially planar first surface, a carrier including a plate-like platform and an upstanding frame thereon, said platform having a substantially planar second surface, said first and second surfaces being in juxtaposition over substantially their entire extents, a light detector mounted in said frame, means on said base for directing light to said light detector, first means cooperating with said platform and said base for moving said platform in a direction parallel to the axis, thereby to move said detector in a direction parallel to said axis, second means cooperating with said platform and said base for tilting said platform with respect to the axis, thereby including a plate-like platform and an upstanding frame thereon, said platform lying upon said base, a light detector mounted in said frame, means on said base for directing light to said light detector, first means cooperating with said platform and said base for moving said platform with respect to said base in a direction parallel to the axis, thereby to move said detector in a direction parallel to the axis, second means cooperating with said platform and said base for tilting said platform with respect to said base with respect to the axis, thereby to tilt said detector with respect to said axis, third means cooperating with said carrier for moving said detector in planes perpendicular to the axis, and means for locking said carrier to preclude operation of said first means, said second means and said third means.

17. The optical system set forth in claim 16, wherein said first locking means has a first condition in which the movability of said platform with respect to said base is substantially reduced but said first means and said second means are operable, and said first locking means has a second condition in which movement of said platform with respect to said base to substantially precluded, said second locking means has a first condition in which the movability of said detector with respect to said frame is substantially reduced but said third means is operable, and said second locking means has a second condition in which movement of said detector with respect to said frame is substantially precluded.

* * * * *

UNITED STATES PATENT OFFICE
CERTIFICATE OF CORRECTION

PATENT NO. : 4,134,129
DATED : January 9, 1979
INVENTOR(S) : Danny Filipovich

It is certified that error appears in the above-identified patent and that said Letters Patent are hereby corrected as shown below:

Column 10, line 7 (Claim 17, line 7), change "to", second occurrence, to --is--.

Signed and Sealed this

Third Day of July 1979

[SEAL]

Attest:

*Attesting Officer*

LUTRELLE F. PARKER
*Acting Commissioner of Patents and Trademarks*